US008829403B2

(12) United States Patent
Perrin et al.

(10) Patent No.: US 8,829,403 B2
(45) Date of Patent: Sep. 9, 2014

(54) SCANNING MULTISPECTRAL TELESCOPE COMPRISING WAVEFRONT ANALYSIS MEANS

(75) Inventors: Guillaume Perrin, Tassin-la-Demi-Lune (FR); Marc Bernot, Cannes la Bocca (FR); Frédéric Falzon, Pegomas (FR); Arnaud Liotard, Grasse (FR)

(73) Assignee: Thales, Neuillu sur Seine (FR)

( * ) Notice: Subject to any disclaimer, the term of this patent is extended or adjusted under 35 U.S.C. 154(b) by 292 days.

(21) Appl. No.: 13/464,888

(22) Filed: May 4, 2012

(65) Prior Publication Data

US 2012/0280111 A1    Nov. 8, 2012

(30) Foreign Application Priority Data

May 5, 2011    (FR) ...................................... 11 01390

(51) Int. Cl.
  *G01J 1/20*    (2006.01)
  *G01J 9/00*    (2006.01)
(52) U.S. Cl.
  CPC .......................................... *G01J 9/00* (2013.01)
  USPC ...................................... 250/201.9; 250/239
(58) Field of Classification Search
  USPC ........ 250/201.9, 203.6, 235, 208.1, 226, 239;
         356/328, 429, 318, 521, 345, 121;
         382/255, 312
  See application file for complete search history.

(56) References Cited

U.S. PATENT DOCUMENTS

| 4,309,602 A | | 1/1982 | Gonsalves et al. |
| 5,300,767 A | * | 4/1994 | Steinle et al. ............... 250/208.1 |
| 5,598,261 A | | 1/1997 | Duncan et al. |
| 5,610,707 A | | 3/1997 | Duncan et al. |
| 7,274,442 B2 | | 9/2007 | Dolne et al. |
| 2004/0056174 A1 | | 3/2004 | Specht et al. |
| 2004/0099787 A1 | | 5/2004 | Dolne et al. |
| 2010/0189377 A1 | | 7/2010 | Cassaing et al. |
| 2010/0245818 A1 | | 9/2010 | Viard et al. |
| 2010/0278378 A1 | | 11/2010 | Pigouche et al. |

FOREIGN PATENT DOCUMENTS

| FR | 2918467 A1 | 1/2009 |
| FR | 2919052 A1 | 1/2009 |
| FR | 2923619 A1 | 5/2009 |

OTHER PUBLICATIONS

R.L. Kendrick et al, "Closed Loop Wave Front Correction Using Phase Diversity", SPIE Conference on Space Telescopes and Instrucments V, Mar. 1998, pp. 844-853, vol. 3356, SPIE.

(Continued)

*Primary Examiner* — Que T Le
(74) *Attorney, Agent, or Firm* — Baker and Hostetler LLP

(57) ABSTRACT

A scanning multispectral telescope comprises an optical architecture arranged so as to focus the image of an object in the vicinity of a photodetection assembly, the area of focus being an image plane. The photodetection assembly comprises a number of parallel rows of photodetectors, each row being dedicated to a particular spectral band, each spectral band being centered on a mean wavelength. The telescope comprises means for acquiring and analyzing the images obtained from the rows of photodetectors using a phase diversity algorithm. Finally, the telescope comprises optical or mechanical means arranged in such a way that at least one of the rows of photodetectors is offset by a fraction of the mean wavelength which corresponds to it on an axis perpendicular to the image plane.

6 Claims, 2 Drawing Sheets

(56) References Cited

OTHER PUBLICATIONS

J.R. Fienup, et al., "Hubble Space Telescope Characterized by Using Phase-Retrieval Algorithms", Applied Optics, Apr. 1, 1993, pp. 1747-1767, vol. 32, No. 10, Optical Society of America.

Bruce H. Dean, et al., "Phase Retrieval Algorithm for JWST Flight and Testbed Telescope", Space Telescopes and Instrumentation I Optical, Infrared, and Millimeter, 2006, pp. 626511-1-626511-17, SPIE 6265.

Robert A Gonsalves, "Phase Retrieval and Diversity in Adaptive Optics", Optical Engineering, Sep./Oct. 1982, pp. 829-832, vol. 21, No. 5, Society of Photo-Optical Instrumentation Engineers.

D. Russell Luke, et al., "Optical Wavefront Reconstruction: Theory and Numerical Methods", SIAM Review, 2002, pp. 169-224, vol. 44, No. 2, Society for Industrial and Applied Mathematics.

M.G. Lofdahl et al., "Wafefront Sensing and Image Restoration from Focused and Defocused Solar Images", Astronomy & Astrophysics, Oct. 1994, pp. 243-264, Supplement Series 107, European Southern Observatory.

Richard G. Paxman, et al., "Joint Estimation of Object and Aberrations by Using Phase Diversity", J. Opt. Soc. Am. A, Jul. 1992, pp. 1072-1085, vol. 9, No. 7, Optical Society of America.

* cited by examiner

SCANNING MULTISPECTRAL TELESCOPE COMPRISING WAVEFRONT ANALYSIS MEANS

CROSS-REFERENCE TO RELATED APPLICATION

This application claims priority to foreign French patent application No. FR 1101390, filed on May 5, 2011, the disclosure of which is incorporated by reference in its entirety.

FIELD OF THE INVENTION

The general field of the invention is that of the analysis or photoreception devices of scanning space optical instruments providing a multispectral analysis.

BACKGROUND

A space optical instrument or space telescope comprises a focusing optical system generally comprising a number of mirrors and an image analysis device comprising photoreception means and computing means so as to be able to process the images received. FIG. 1 represents an exploded view of the photoreception means, essentially comprising a photodetection assembly EPD, a filter F, a cover C and a protection window H. When the photoreception assembly is intended to carry out spectral analysis, it includes a suitable image analysis device capable of providing images in different spectral bands.

This device operates by scanning. As can be seen in FIG. 2, the photodetection assembly EPD comprises a number of parallel rows L of photodetectors, each row being dedicated to a particular spectral band. This arrangement makes it possible to analyze an image line spatially on an axis x parallel to that of the rows of photodetectors and spectrally on an axis z perpendicular to these same rows. The reconstruction of the complete image in different spectral bands is handled by the scanning.

Obviously, every effort is made to obtain the most accurate images possible. Now, these instruments are capable only of measuring a light intensity and the phase information of the image is therefore lost. The data acquired in the direction x of the rows of photodetectors and denoted $\{d(x)\}$ are noise affected measurements of the convolution of the observed object, being expressed $o(x,\lambda)$ at a wavelength $\lambda$, with the percussive response of the optical system, or "PSF", an acronym standing for "Point Spread Function", and denoted $h(x, \lambda)$, integrated over the spectral band of intensity $f(\lambda)$ of the acquisition channel. Thus, the relationship 1 applies:

$$d(x) = N[h * o(x)] = N\left[\int_\lambda (h(x, \lambda) * o(x, \lambda)) f(\lambda) d\lambda\right] \quad \text{Relationship 1}$$

The optical quality of the instrument is characterized by a wavefront phase error, also known by the acronym "WFE", standing for "Wavefront Error". This WFE takes into account the aberrations of the mirrors of the telescope, but also the various defects of alignment of the mirrors forming the telescope and of the detector relative to the telescope. The WFE information is "contained" in the optical PSF of the system denoted $h^{OPT}(x,\lambda)$, the overall PSF being equal to the convolution thereof with other components linked to the quality of the detector, to camera shakes, etc. Thus, the relationship 2 applies:

$$h^{OPT}(x, \lambda) = \left|TF^{-1}[A(p)e^{i\varphi(p,\lambda)}]\left(\frac{x}{\lambda F}\right)\right|^2 \quad \text{Relationship 2}$$

in which $A(p)$ and $\varphi(p,\lambda)$ are respectively the amplitude and the phase of the field at the level of the pupil of the instrument, F being the focal length of the instrument.

An estimation of the WFE is essential inasmuch as its knowledge makes it possible to correct all or some of the defects of the instrument to retrieve the cleanest possible image of the object. It requires the installation of a dedicated device. This knowledge is essential when the instrument is active, that is to say when it has means for correcting the form or the alignment of the mirrors so as to constantly keep the sharpest possible image.

There are various wavefront analysis solutions making it possible to retrieve the WFE. Generally, the analyzers are classified in two families, which are the so-called "pupil plane" analyzers and the so-called "focal plane" analyzers.

Among the pupil plane analyzers, there is mainly the Shack-Hartmann method which consists in sampling the input pupil and imaging, in a dedicated channel, all the observed scenes, in order to locally measure the WFE. The drawback with such an approach is the use of a portion of the input flux for an "ancillary" analysis channel, as well as the complexity of the optical device that has to be put in place.

The focal plane analyzers do not have such drawbacks, since they involve using acquisitions produced at the level of the focal plane of the instrument to estimate the wavefront. One way of dealing with this problem is, for example, to acquire two images of the same scene $o(x)$, one being defocused relative to the other and to use a phase diversity algorithm. The phase diversity can be used for the purposes of image restoration, the aim then being to find $o(x)$, or for the purposes of wavefront analysis, the aim in this case being to find the WFE $\varphi(p)$, the WFE generally being parameterized as a linear combination of Zernike vectors representative of the focusing defect or of the geometrical aberrations such as astigmatism. (1)

The analyses by phase diversity therefore make it possible to determine the WFE of the telescope from image acquisitions. This phase information can be used in an active optical system to correct it in closed loop mode, or else subsequently to restore the acquired data and thus enhance the image quality.

Very many papers have been published, over almost 30 years, concerning wavefront analysis by phase diversity and the space applications of this analysis. The great majority propose various algorithmic approaches to resolve this problem, others describe its application to particular missions when the object is known and punctual. The expression "phase restitution" then applies.

The article by Gonsalves entitled "Phase retrieval and diversity in adaptive optics", Optical Engineering, 21, 1982 is notably cited as being considered to be the founding paper on phase diversity.

Also to be cited is the paper by Paxman entitled "Joint estimation of object and aberrations by using phase diversity", Journal of the Optical Society of America A, 9(7), 1992, which makes reference to and describes the algorithmic approach most commonly used.

Also to be cited is the paper by Fienup entitled "Hubble space telescope characterized by using phase retrieval algorithms", Applied Optics, 32(10):1747-1767, 1993; that by Lofdahl entitled "Wavefront sensing and image restoration from focused and defocused solar images", Astronomy and Astrophysics, 107:243-264, 1994, and finally that by Dean entitled "Phase retrieval algorithm for JWST flight testbed telescope, Space telescopes and Instrumentation", SPIE 6265, 2006 which present applications of phase diversity to concrete cases such as the study of sunspots, the adjustment of the Hubble space telescope (HST) or that of the James Webb Space Telescope (JWST).

The paper by Kendrick entitled "Closed-loop wavefront correction using phase diversity", SPIE 3356 Space Telescopes and Instruments, 1998 describes a closed loop mode approach, with some architectural designs of phase diversity sensors.

Finally, the paper by Luke entitled "Optical wavefront reconstruction; theory and numerical methods", SIAM review 44(2):169-224, 2002 presents a state of the art of the different algorithmic approaches.

Patents have also been filed on wavefront analysis, either concerning the phase diversity algorithm or concerning the means for simply creating the defocusings needed for this phase diversity algorithm.

Notably to be cited is the U.S. Pat. No. 4,309,602 entitled "Wavefront sensing by phase retrieval" which describes the algorithmic approach and the context of use of a sensor-wavefront analysis-adaptive optics loop.

Also to be cited is the U.S. Pat. No. 5,598,261 entitled "Wavefront sensor for a scanning imager" which presents a TDI concept comprising two parallel detectors, the second being defocused relative to the first by the addition of a transparent substrate. They can be defocusings added to all or a portion of the length of the detector or else in areas between strips.

Also to be cited is the U.S. Pat. No. 5,610,707 entitled "Wavefront sensor for a scanning imager" which presents a concept similar to the preceding one but suitable for a matrix sensor with use of a beam splitter to obtain the focused and defocused images.

The application US 2004/0099787A1 entitled "System and method for determining optical aberrations in scanning imaging systems by phase diversity" is to be cited, presenting a TDI concept comprising two parallel rows of detectors, one of them, potentially consisting of a number of elements, being offset along the optical axis relative to the other to defocus the image.

The patents US 2004/0056174 entitled "Fast phase diversity wavefront correction using a neural network" and FR 2919052 entitled "Procédé d'estimation d'au moins une déformation du front d'onde d'un système optique ou d'un objet observé par le système optique et dispositif associé" (Method for estimating at least a deformation of the wavefront of an optical system or of an object observed by the optical system and associated device) present an adaptation of the algorithmic part to rapid computation needs.

Finally, the U.S. Pat. No. 7,274,442 entitled "Closed loop wavefront sensor using field programmable gate array" presents an architectural approach to onboard algorithmic processing, combining the use of phase diversity sensors and FPGAs.

SUMMARY OF THE INVENTION

The device according to the invention makes it possible to apply the wavefront analysis by phase diversity methods to multispectral detection, this making it possible to obtain quality images in a plurality of spectral bands at the price of minor modifications to the optical architecture of the telescope or its detection assembly.

More specifically, the subject of the invention is a scanning multispectral telescope comprising at least:
an optical architecture arranged so as to focus the image of an object in the vicinity of a photodetection assembly, the area of focus being called image plane;
said photodetection assembly comprising a number of parallel rows of photodetectors, each row being dedicated to a particular spectral band, each spectral band being centred on a mean wavelength;
means for acquiring and analyzing the images obtained from the rows of photodetectors, said means comprising a phase diversity algorithm;
characterized in that the telescope comprises optical or mechanical means arranged in such a way that at least one of the rows of photodetectors is offset by a fraction of the mean wavelength which corresponds to it on an axis perpendicular to the image plane.

Advantageously, in a first embodiment, the rows of photodetectors are situated in a same plane inclined by a determined angle relative to the image plane, the inclination taking place about a direction parallel to the rows of photodetectors.

Advantageously, in a second embodiment, the rows of photodetectors being situated in a same plane parallel to the image plane, the photodetection assembly comprises a glass plate arranged above the rows of photodetectors and whose optical thickness is variable on an axis perpendicular to the image plane.

Advantageously, the photodetection assembly comprising four rows of photodetectors, the first row is offset by a half mean wavelength below the image plane, the second row is offset by a quarter mean wavelength below the image plane, the third row is offset by a quarter mean wavelength above the image plane, the fourth row is offset by a half mean wavelength above the image plane.

Advantageously, the scanning multispectral telescope comprises at least one active mirror and a servocontrol device using the data obtained from the acquisition and analysis means.

Advantageously, the optical architecture of the telescope comprises only passive optical components.

BRIEF DESCRIPTION OF THE DRAWINGS

The invention will be better understood, and other advantages will become apparent, from reading the following description, given as a nonlimiting example, and by virtue of the appended figures in which.

DETAILED DESCRIPTION

As has been stated, a scanning multispectral telescope comprises a photodetection assembly. The latter comprises a number of parallel rows of photodetectors, each row being dedicated to a particular spectral band, each spectral band being centred on a mean wavelength, the rows all being situated in a same plane.

In the prior art devices, a same multispectral image line is perfectly focused on the rows of photodetectors. The plane of the photoreception rows and the image plane are one and the same.

In the device according to the invention, the telescope comprises optical or mechanical means arranged in such a way that at least one of the rows of photodetectors is offset by a fraction of the mean wavelength which corresponds to it on an axis perpendicular to the image plane.

Thus, it becomes possible to carry out, in parallel with the spectral analysis, an analysis of the wavefront given by the optics of the telescope by using the phase diversity analysis methods as explained above.

Figure 1:
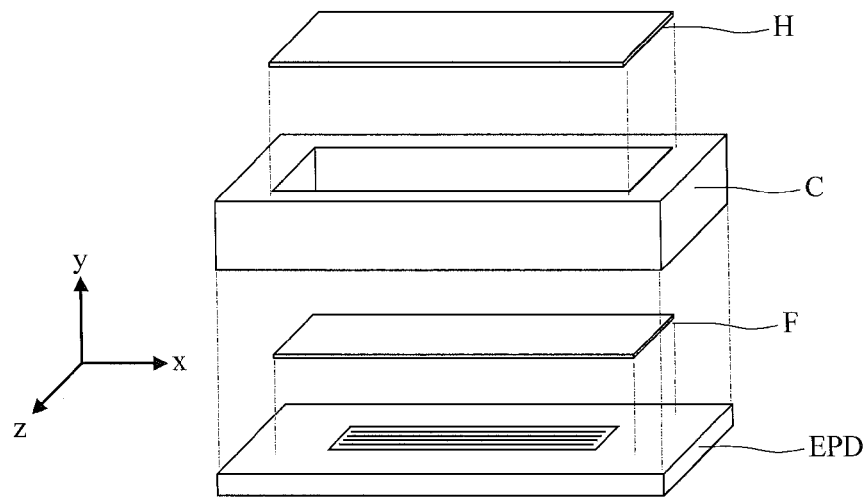
FIG. 1 represents an exploded view of a photodetection assembly according to the prior art.
Figure 2:
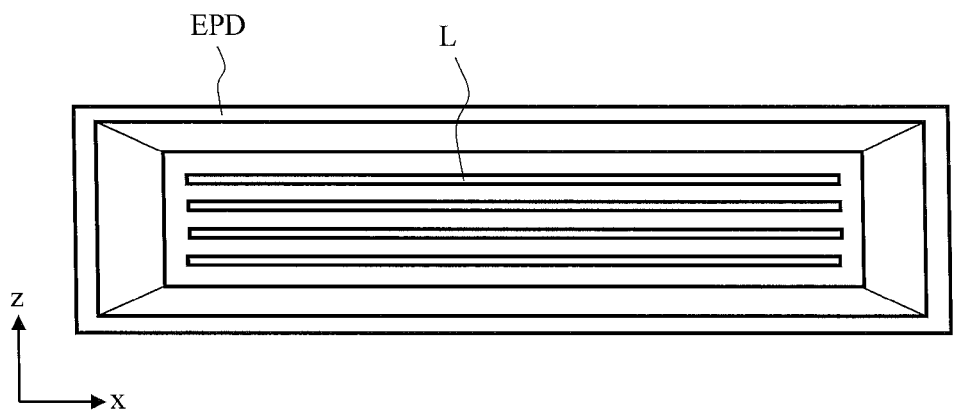
FIG. 2 represents the rows of photodetectors of the preceding assembly.
Figure 3:
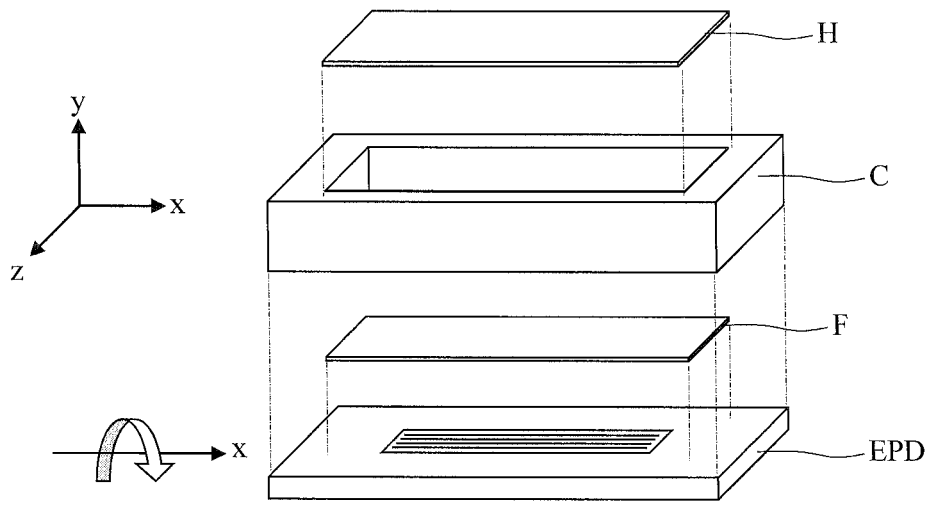
FIG. 3 represents a first embodiment of a photodetection assembly according to the invention.
Figure 4:
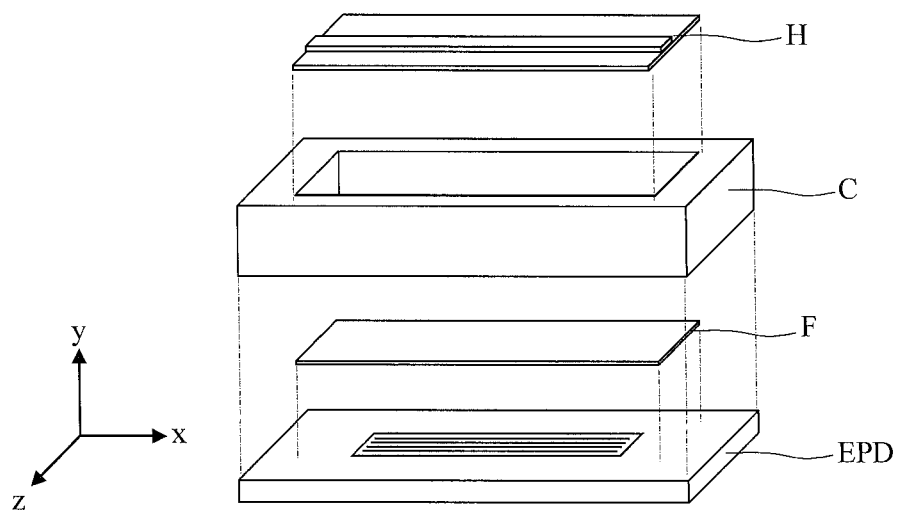
FIG. 4 represents a second embodiment of a photodetection assembly according to the invention.

There are various simple means that make it possible to provide this offset. As nonlimiting examples, FIGS. 3 and 4 represent two possible embodiments. Each figure represents an exploded view of a photodetection assembly. The latter essentially comprises four elements which are:

- the optoelectronic photodetection component EPD comprising the rows L of photodetectors;
- a spectral filter F covering the rows of photodetectors;
- a mechanical cover C which protects the above two components;
- a sealing window arranged on this mechanical cover.

FIG. 3 represents a first possible embodiment for producing the offset of the rows. In this mode, the plane of the rows of photodetectors is inclined by a determined angle relative to the image plane, the inclination taking place about a direction x parallel to the rows of photodetectors. The direction of scanning takes place on the axis z. In this case, the offset from one row to the other is identical inasmuch as the photodetection rows are regularly spaced.

FIG. 4 represents a second possible embodiment for producing the offset of the rows. In this second mode, the photodetection assembly comprises a glass plate H arranged above the rows of photodetectors and whose optical thickness is variable on an axis perpendicular to the image plane. This glass plate may be a plate with planar and parallel faces covered with a deposition of thin layers of known thickness and making it possible to obtain the desired offset. In FIG. 4, the excess thickness represented is not representative of the real excess thickness which does not exceed a few hundreds of nanometers or a few microns.

As an indication, if the photodetection assembly comprises four rows of photodetectors, the necessary offsets may be as follows:

- the first row is offset by a half mean wavelength below the image plane;
- the second row is offset by a quarter mean wavelength below the image plane;
- the third row is offset by a quarter mean wavelength above the image plane;
- the fourth row is offset by a half mean wavelength above the image plane.

The main advantage of this solution is that it allows for a simple provision of a channel at the level of the focal plane without requiring a dedicated channel for determining the WFE. This provision at the level of the photodetection rows to introduce the desired diversities allows for a great improvement in the estimated phase.

The invention claimed is:

1. A scanning multispectral telescope comprising:
    an optical architecture arranged so as to focus the image of an object in the vicinity of a photodetection assembly, the area of focus being an image plane;
    said photodetection assembly comprising a number of parallel rows of photodetectors, each row being dedicated to a particular spectral band, each spectral band being centred on a mean wavelength;
    means for acquiring and analyzing the images obtained from the rows of photodetectors, said means comprising a phase diversity algorithm;
    wherein the telescope comprises optical or mechanical means arranged in such a way that at least one of the rows of photodetectors is offset by a fraction of the mean wavelength which corresponds to the associated row of photodetectors on an axis perpendicular to the image plane, the rows of photodetectors being situated in a same plane inclined by a determined angle relative to the image plane, the inclination taking place about a direction parallel to the rows of photodetectors.

2. The scanning multispectral telescope according to claim 1, wherein, the photodetection assembly comprising 4 rows of photodetectors, the first row is offset by a half mean wavelength below the image plane, the second row is offset by a quarter mean wavelength below the image plane, the third row is offset by a quarter mean wavelength above the image plane, the fourth row is offset by a half mean wavelength above the image plane.

3. The scanning multispectral telescope according to claim 1, wherein the telescope comprises at least one active mirror and a servocontrol device using data obtained from the acquisition and analysis means.

4. The scanning multispectral telescope according to claim 1, wherein the optical architecture comprises only passive optical components.

5. The scanning multispectral telescope according to claim 2, wherein the telescope comprises at least one active mirror and a servocontrol device using data obtained from the acquisition and analysis means.

6. The scanning multispectral telescope according to claim 2, wherein the optical architecture comprises only passive optical components.

* * * * *